(12) United States Patent
Yu et al.

(10) Patent No.: US 9,494,353 B2
(45) Date of Patent: Nov. 15, 2016

(54) TEMPERATURE CONTROL EQUIPMENT

(71) Applicant: CHROMA ATE INC., Tao-Yuan Hsien (TW)

(72) Inventors: Ben-Mou Yu, Tao-Yuan Hsien (TW); Ming-Chieh Lin, Tao-Yuan Hsien (TW); Ching-Wen Chang, Tao-Yuan Hsien (TW); Xin-Yi Wu, Tao-Yuan Hsien (TW)

(73) Assignee: CHROMA ATE INC., Tao-Yuan (TW)

( * ) Notice: Subject to any disclaimer, the term of this patent is extended or adjusted under 35 U.S.C. 154(b) by 206 days.

(21) Appl. No.: 14/302,442

(22) Filed: Jun. 12, 2014

(65) Prior Publication Data
US 2015/0007973 A1   Jan. 8, 2015

(30) Foreign Application Priority Data

Jul. 3, 2013   (TW) .............................. 102123830 A

(51) Int. Cl.
F25B 21/02 (2006.01)
F25B 49/00 (2006.01)
G05D 23/19 (2006.01)

(52) U.S. Cl.
CPC ............... *F25B 49/00* (2013.01); *F25B 21/02* (2013.01); *G05D 23/1919* (2013.01)

(58) Field of Classification Search
CPC .... F25B 21/02; F25B 49/00; G05D 23/1919
See application file for complete search history.

(56) References Cited

U.S. PATENT DOCUMENTS

| | | | | |
|---|---|---|---|---|
| 4,362,023 A | 12/1982 | Falco | | |
| 4,704,872 A * | 11/1987 | Jones | ....................... | F25B 21/02 62/3.2 |
| 4,829,771 A * | 5/1989 | Koslow | ................... | F25B 21/02 62/3.64 |
| 5,028,988 A * | 7/1991 | Porter | ..................... | H01L 23/38 165/80.4 |
| 5,940,784 A * | 8/1999 | El-Husayni | .......... | G01N 25/005 374/43 |
| 6,086,799 A * | 7/2000 | Buazza | ............ | B29D 11/00865 264/1.38 |
| 6,119,460 A * | 9/2000 | Huang | .................... | F25B 21/02 136/242 |
| 6,448,544 B1 * | 9/2002 | Stanton | ................. | G01T 1/2928 250/208.1 |
| 6,673,278 B1 * | 1/2004 | Buazza | ................... | B29C 35/08 264/1.38 |

(Continued)

FOREIGN PATENT DOCUMENTS

| CN | 2435733 Y | 6/2001 |
|---|---|---|
| CN | 1876584 A | 12/2006 |

(Continued)

*Primary Examiner* — Ljiljana Ciric
(74) *Attorney, Agent, or Firm* — CKC & Partners Co., Ltd.

(57) ABSTRACT

A temperature control equipment is capable of controlling a tested object to a predetermined temperature. The temperature control equipment includes a thermal conducting plate, a temperature regulating module, a carrier plate, and a thermoelectric cooling module. The temperature regulating module is thermally connected to the thermal conducting plate for regulating the thermal conducting plate to a reference temperature. The carrier plate is used to accommodate the tested object. The thermoelectric cooling module is thermally connected between the thermal conducting plate and the carrier plate for controlling the tested object to the predetermined temperature via the carrier plate based on the reference temperature.

9 Claims, 5 Drawing Sheets

(56) References Cited

U.S. PATENT DOCUMENTS

| | | | | |
|---|---|---|---|---|
| 7,134,486 B2 * | 11/2006 | Santiago | ............ | B01D 19/0031 |
| | | | | 165/104.28 |
| 7,876,116 B1 * | 1/2011 | Cheng | .................. | G01R 1/0458 |
| | | | | 324/750.05 |
| 2003/0154723 A1 * | 8/2003 | Lin | ......................... | F25B 21/02 |
| | | | | 62/3.2 |
| 2006/0055028 A1 * | 3/2006 | Hasunuma | ............ | H01L 23/367 |
| | | | | 257/706 |
| 2011/0006124 A1 | 1/2011 | Kai | | |

FOREIGN PATENT DOCUMENTS

| | | |
|---|---|---|
| CN | 201688621 U | 12/2010 |
| TW | M275804 | 9/2005 |
| TW | 200726965 | 7/2007 |
| TW | M349478 U | 1/2009 |
| TW | M437133 | 9/2012 |

* cited by examiner

US 9,494,353 B2

TEMPERATURE CONTROL EQUIPMENT

RELATED APPLICATIONS

This application claims priority to Taiwan Application Serial Number 102123830, filed Jul. 3, 2013, which is herein incorporated by reference.

BACKGROUND

1. Technical Field

The present disclosure relates to a temperature control equipment.

2. Description of Related Art in general, in rapid temperature variation experiments of a tested object, air is usually taken as a medium, and a heat source or a cold source is applied to the tested object in form of airflow. However, the thermal conductivity of the air is less than ideal, and it is hard to control airflows, so the actual temperature variation and the temperature uniformity of the tested object have rooms for improvement.

At present, the developed TEC (Thermoelectric cooler) is a kind of temperature control device capable of precisely controlling temperature. Although the performances of the speed of increasing or decreasing temperature and the temperature uniformity of the TEC are good, the temperature controllable range of the TEC is not large enough.

Accordingly, how to provide an improved temperature controlling approach to achieve technical features such as high temperature uniformity, precise temperature control, rapid temperature increase or decrease, and wide temperature controlling range becomes an important issue to be solved by those in the industry.

SUMMARY

The disclosure provides a temperature control equipment to solve the above-mentioned problems.

The disclosure provides a temperature control equipment for controlling a tested object to a predetermined temperature. The temperature control equipment includes a thermal conducting plate, a temperature regulating module, a carrier plate, and a thermoelectric cooling module. The temperature regulating module is thermally connected to the thermal conducting plate, and is used to regulate the thermal conducting plate to a reference temperature. The carrier plate is used to accommodate the tested object. The thermoelectric cooling module is thermally connected between the thermal conducting plate and the carrier plate, and is used to control the tested object to the predetermined temperature via the carrier plate based on the reference temperature.

The disclosure further provides a temperature control equipment for controlling a tested object to a predetermined temperature. The temperature control equipment includes a thermal conducting plate, a heating unit, a heating controller, a cooling assembly, a cooling controller, a carrier plate, and a thermoelectric cooling module. The heating unit is thermally connected to the thermal conducting plate, and is used to heat the thermal conducting plate. The heating controller is electrically connected to the heating unit, and is used to drive the heating unit to heat the thermal conducting plate to a first reference temperature. The cooling assembly is thermally connected to the thermal conducting plate, and is used to cool the thermal conducting plate. The cooling controller is electrically connected to the cooling assembly, and is used to drive the cooling assembly to cool the thermal conducting plate to a second reference temperature. The carrier plate is used to accommodate the tested object. The thermoelectric cooling module is thermally connected between the thermal conducting plate and the carrier plate, and is used to control the tested object to the predetermined temperature via the carrier plate based on the first reference temperature or the second reference temperature.

It is to be understood that both the foregoing general description and the following detailed description are by examples and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
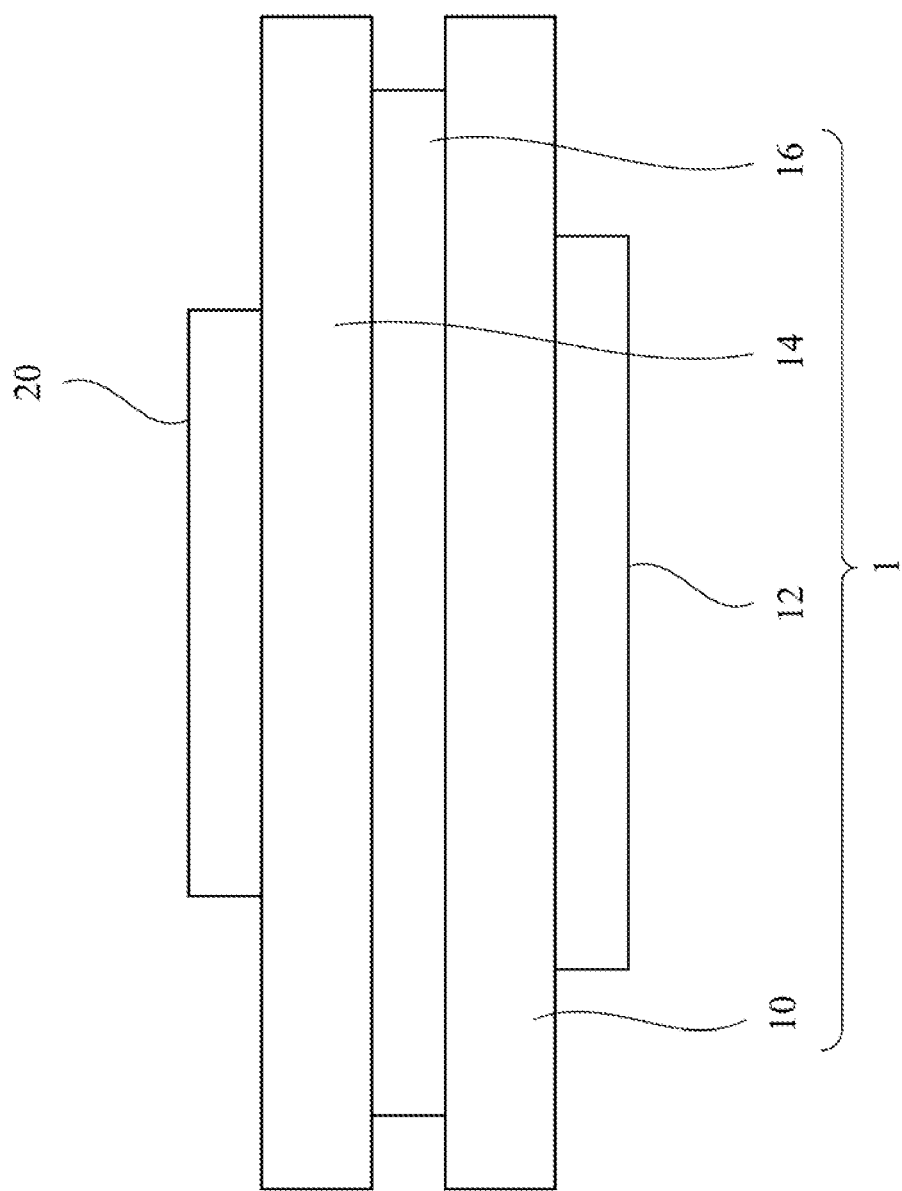
FIG. 1 is a schematic diagram of a temperature control equipment according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a temperature control equipment 1 according to an embodiment of the disclosure. The temperature control equipment 1 is used to control a tested object 20 to a predetermined temperature. The temperature control equipment 1 includes a thermal conducting plate 10, a temperature regulating module 12, a carrier plate 14, and a thermoelectric cooling module 16. The temperature regulating module 12 of the temperature control equipment 1 is thermally connected to the thermal conducting plate 10, and is used to regulate the thermal conducting plate 10 to a reference temperature. The carrier plate 14 of the temperature control equipment 1 is used to accommodate the tested object 20. The thermoelectric cooling module 16 of the temperature control equipment 1 is thermally connected between the thermal conducting plate 10 and the carrier plate 14, and is used to control the tested object 20 to the predetermined temperature via the carrier plate 14 based on the reference temperature.

Figure 2:
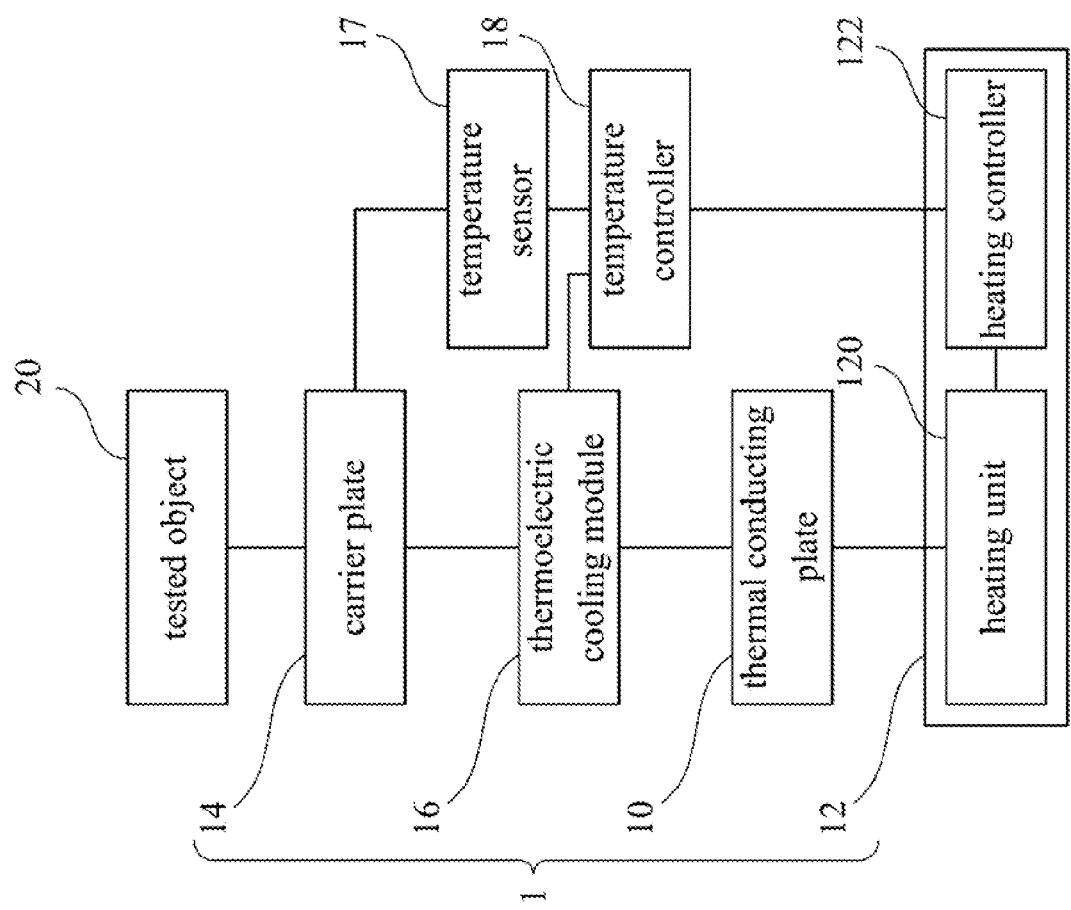
FIG. 2 is a detailed schematic diagram of the temperature control equipment in FIG. 1.
Figure 3:
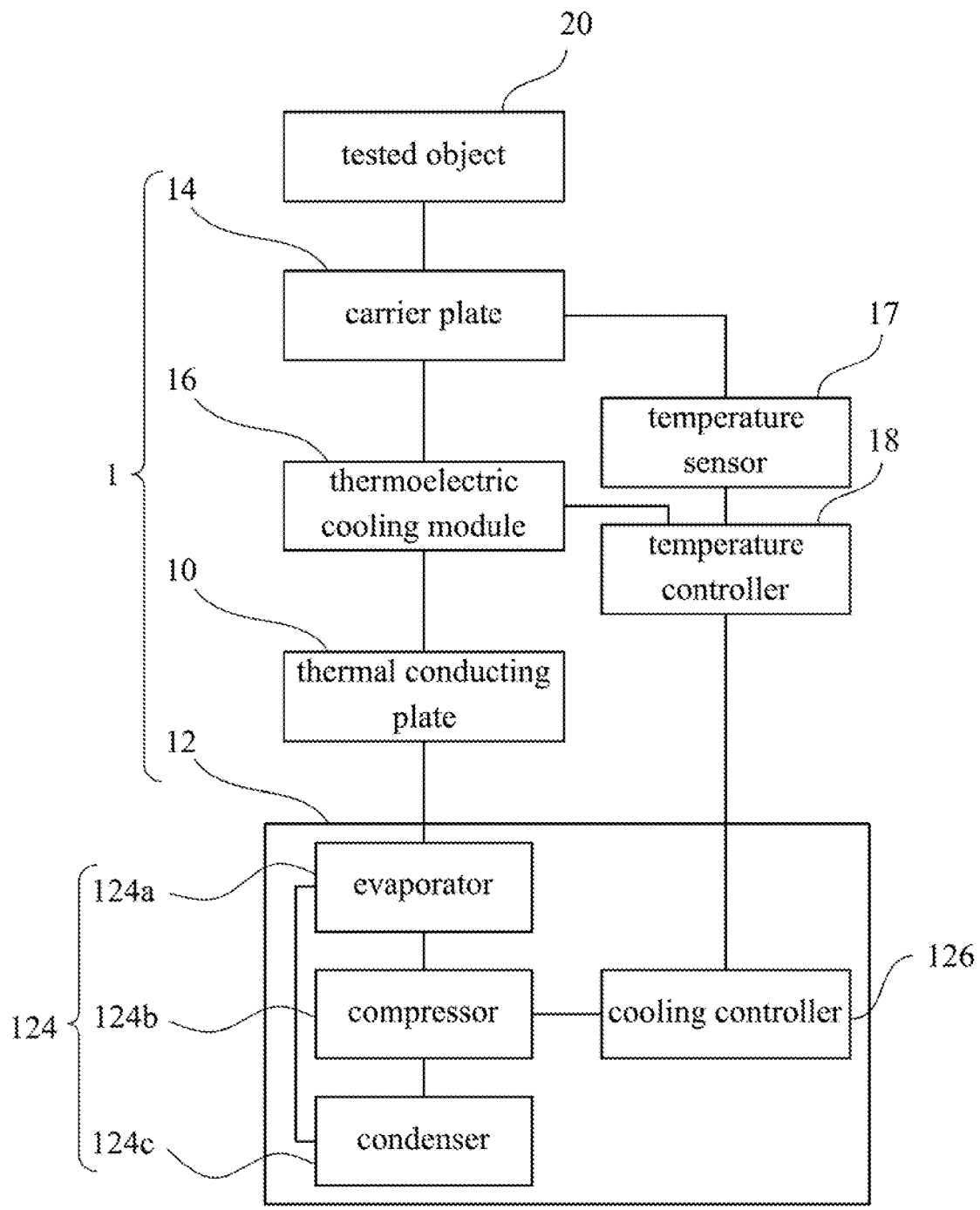
FIG. 3 is another detailed schematic diagram of the temperature control equipment in FIG. 1.

FIG. 2 is a detailed schematic diagram of the temperature control equipment 1 in FIG. 1. FIG. 3 is another detailed schematic diagram of the temperature control equipment 1 in FIG. 1. In the embodiment of the disclosure, the temperature control equipment 1 further includes a temperature sensor 17 and a temperature controller 18. The temperature sensor 17 of the temperature control equipment 1 is thermally connected to the carrier plate 14, and is used to sense an actual temperature of the tested object 20 via the carrier plate 14. The temperature controller 18 of the temperature control equipment 1 is electrically connected between the thermoelectric cooling module 16 and the temperature sensor 17, and is used to control the thermoelectric cooling module 16 to heat or to cool the tested object 20 via the carrier plate 14, so as to control the actual temperature of the tested object 20 to the predetermined temperature.

The thermoelectric cooling module 16 of the temperature control equipment 1 is an electronic component that is substantially made from semiconductor thermoelectric materials (e.g., $Bi_2Te_3$) and can serve as a small heat pump. By applying a lower DC voltage at two ends of the thermoelectric cooling module 16, the heat will be transmitted from an end to another end of the thermoelectric cooling module 16. When the temperature of an end of the thermoelectric cooling module 16 is decreased, another end of the thermoelectric cooling module 16 is increased. By changing the current direction, the direction of heat flow can be changed. Hence, the thermoelectric cooling module 16 can achieve the functions of heating and cooling. Because the thermoelectric cooling module 16 has a closed-loop temperature control structure, the thermoelectric cooling module 16 can precisely control temperature within the range of 0.1° C.

As shown in FIG. 2, the temperature regulating module 1 of the temperature control equipment 1 includes a heating unit 120 and a heating controller 122. The heating unit 120 of the temperature regulating module 12 is thermally connected to the thermal conducting plate 10, and is used to heat the thermal conducting plate 10. The heating controller 122 of the temperature regulating module 12 is electrically connected to the heating unit 120, and is used to drive the heating unit 120 to heat the thermal conducting plate 10 to the reference temperature (e.g., a higher first reference temperature).

When the predetermined temperature is larger than an ambient temperature, how high the reference temperature (i.e., the first reference temperature) can be depends on the heating capability of the heating unit 120. One of the main functions of the temperature regulating module 12 is to heat the thermal conducting plate 10 to the reference temperature, so as to substantially reduce the adjusted temperature difference that the thermoelectric cooling module 16 controls the tested object 20 to the predetermined to precisely control the thermal conducting plate 10 to the reference temperature, and thus the cost of installing a temperature feedback component like the temperature sensor 17 can be saved. However, in practice, installing the temperature feedback component to help the temperature regulating module 12 to precisely control the thermal conducting plate 10 to the reference temperature is also a viable option.

The thermoelectric cooling module 16 of the temperature control equipment 1 has a temperature controlling range. When the predetermined temperature is larger than the ambient temperature, and a temperature difference between the predetermined temperature and an ambient temperature is larger than the temperature controlling range of the thermoelectric cooling module 16, the temperature controller 18 controls the heating controller 122 of the temperature regulating module 12 to drive the heating unit 120, so as to heat the thermal conducting plate 10 to the reference temperature (i.e., the first reference temperature). Thus, the thermoelectric cooling module 16 can further precisely control the tested object 20 to the predetermined temperature via the carrier plate 14 based on the reference temperature. In order to achieve the purpose of controlling the tested object 20 to the predetermined temperature, the temperature difference between reference temperature provided by the temperature regulating module 12 and the predetermined temperature must be smaller than the temperature controlling range of the thermoelectric cooling module 16.

In contrast, when the predetermined temperature is larger than the predetermined temperature and the ambient temperature is smaller than the temperature controlling range of the thermoelectric cooling module 16, the temperature controller 18 can directly controls the thermoelectric cooling module 16 to precisely control the tested object 20 to the predetermined temperature via the carrier plate 14, and the temperature regulating module 12 is unnecessary to provide the reference temperature (i.e., the first reference temperature) first. Therefore, the temperature control equipment 1 of the disclosure can be more flexible to drive the necessary components to operate in response to the temperature difference between the predetermined temperature and the ambient temperature, and thus the energy consumption can be reduced under certain circumstances.

In an embodiment of the disclosure, the heating unit 120 of the temperature regulating module 12 is a heating coil disposed in the thermal conducting plate 10, but the heating unit 120 of the disclosure is not limited in this regard.

As shown in FIG. 3, the temperature regulating module 12 of the temperature control equipment 1 further includes a cooling assembly 124 and a cooling controller 126. The cooling assembly 124 of the temperature regulating module 12 is thermally connected to the thermal conducting plate 10, and is used to cool the thermal conducting plate 10. The cooling controller 126 of the temperature regulating module 12 is electrically connected to the cooling assembly 124, and is used to drive the cooling assembly 124 to cool the thermal conducting plate 10 to the reference temperature (e.g., a lower second reference temperature).

When the predetermined temperature is smaller than the ambient temperature, how low the reference temperature (i.e., the second reference temperature) can be depends on the cooling capability of the cooling assembly 124. One of the main functions of the temperature regulating module 12 is to cool the thermal conducting plate 10 to the reference temperature, so as to substantially reduce the adjusted temperature difference that the thermoelectric cooling module 16 controls the tested object 20 to the predetermined temperature. Therefore, the temperature regulating module 12 does not have to precisely control the thermal conducting plate 10 to the reference temperature, and thus the cost of installing a temperature feedback component like the temperature sensor 17 can be saved. However, in practice, installing the temperature feedback component to help the temperature regulating module 12 to precisely control the thermal conducting plate 10 to the reference temperature is also a viable option.

The thermoelectric cooling module 16 of the temperature control equipment 1 has the temperature controlling range. When the predetermined temperature is smaller than the ambient temperature, and a temperature difference between the predetermined temperature and an ambient temperature is larger than the temperature controlling range of the thermoelectric cooling module 16, the temperature controller 18 controls the cooling controller 126 of the temperature regulating module 12 to drive the cooling assembly 124, so as to cool the thermal conducting plate 10 to the reference temperature (i.e., the second reference temperature). Thus, the thermoelectric cooling module 16 can further precisely control the tested object 20 to the predetermined temperature via the carrier plate 14 based on the reference temperature. In order to achieve the purpose of controlling the tested object 20 to the predetermined temperature, the temperature difference between reference temperature provided by the temperature regulating module 12 and the predetermined temperature must be smaller than the temperature controlling range of the thermoelectric cooling module 16.

In contrast, when the predetermined temperature is smaller than the ambient temperature, and the temperature difference between the predetermined temperature and the ambient temperature is smaller than the temperature controlling range of the thermoelectric cooling module 16, the temperature controller 18 can directly controls the thermoelectric cooling module 16 to precisely control the tested object 20 to the predetermined temperature via the carrier plate 14, and the temperature regulating module 12 is unnecessary to provide the reference temperature (i.e., the second reference temperature) first. Therefore, the temperature control equipment 1 of the disclosure can, be more flexible to drive the necessary components to operate in response to the temperature difference between the predetermined temperature and the ambient temperature, and thus the energy consumption can be reduced under certain circumstances.

In the embodiment of the disclosure, the cooling assembly 124 of the temperature regulating module 12 includes an evaporator 124a, a compressor 124b, and a condenser 124c. The evaporator 124a of the cooling assembly 124 is thermally connected to the thermal conducting plate 10, and is used to absorb the heat of the thermal conducting plate 10 by a vapor-liquid mixed refrigerant, so as to cool the thermal conducting plate 10 to the reference temperature. After absorbing the heat, the vapor-liquid mixed refrigerant is transferred to a low-temperature and low-pressure gaseous refrigerant. The compressor 124b of the cooling assembly 124 is thermally connected to the evaporator 124a and electrically connected to the cooling controller 126. The cooling controller 126 drives the compressor 124b to compress the low-temperature and low-pressure gaseous refrigerant, so as to transform the low-temperature and low-pressure gaseous refrigerant to a high-temperature and high-pressure liquid refrigerant. The condenser 124c of the cooling assembly 124 is thermally connected between the evaporator 124a and the compressor 124b, and is used to dissipate the heat of the high-temperature and high-pressure liquid refrigerant by water or air. The evaporator 124a, the compressor 124b, and the condenser 124c of the cooling assembly 124 are sequentially connected by metal tubes, and the refrigerant performs heat exchange among the evaporator 124a, the compressor 124b, and the condenser 124c via the metal tubes, but the disclosure is not limited in this regard.

For example, the first reference temperature that the heating unit 120 of the temperature regulating module 12 can provide is 70° C., and the second reference temperature that the cooling assembly 124 of the temperature regulating module 12 can provide is −30° C. if the temperature controlling range of the thermoelectric cooling module 16 is 60° C., the temperature control equipment 1 can actually control the temperature from −90° C. to 130° C. with the assistance of the temperature regulating module 12.

Figure 4:
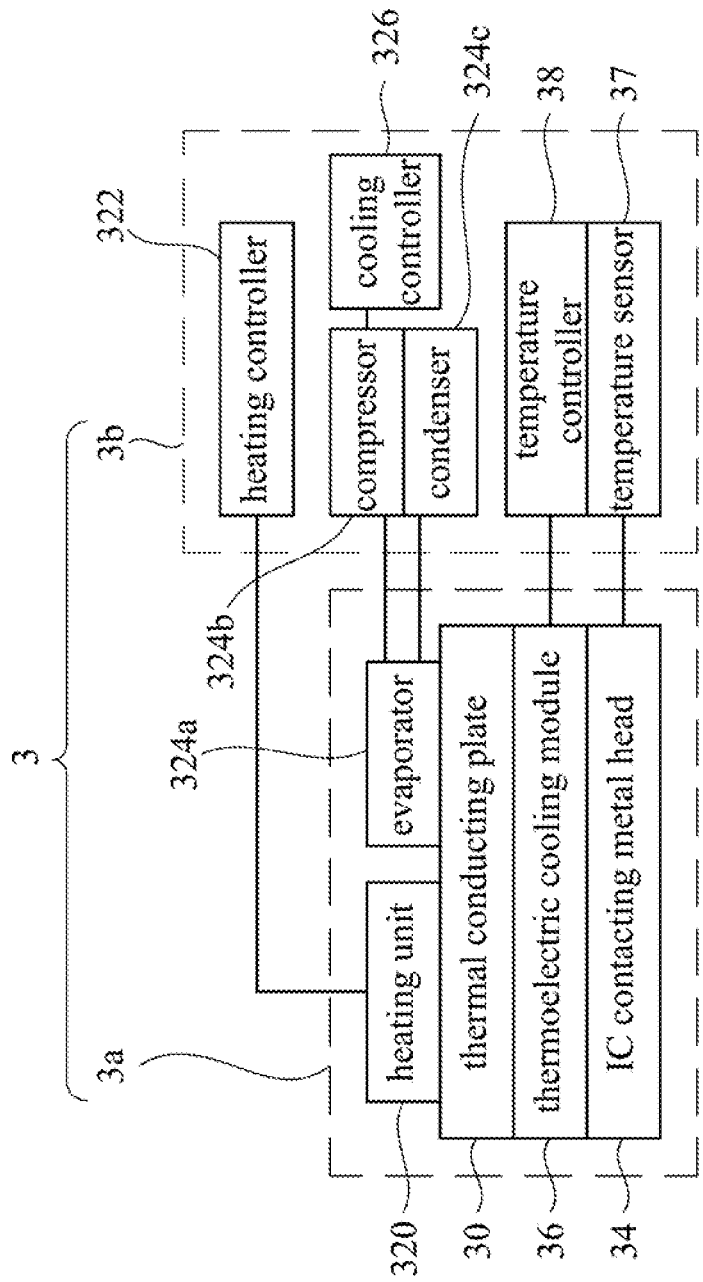
FIG. 4 is a schematic diagram of temperature control equipment according to an embodiment of the disclosure.

FIG. 4 is a schematic diagram of temperature control equipment 3 according to an embodiment of the disclosure. In the embodiment of the disclosure, the temperature control equipment 3 can be applied in IC industry. The temperature control equipment 3 includes an IC thermostatic head 3a and a host 3b. The IC thermostatic head 3a of the temperature control equipment 3 includes a thermal conducting plate 30, a heating unit 320, an evaporator 324a, an IC contacting metal head 34, and a thermoelectric cooling module 36. The heating unit 320 of the IC thermostatic head 3a is thermally connected to the thermal conducting plate 30, and is used to heat the thermal conducting plate 30 to a reference temperature (e.g., a higher first reference temperature). The evaporator 324a of the IC thermostatic head 3a is thermally connected to the thermal conducting plate 30, and is used to absorb the heat of the thermal conducting plate 30 by the refrigerant, so as to cool the thermal conducting plate 30 to another reference temperature (e.g., a lower second reference temperature). The thermoelectric cooling module 36 of the IC thermostatic head 3a is thermally connected between the thermal conducting plate 30 and the IC contacting metal head 34, and is used to control the IC contacting metal head 34 to the predetermined temperature based on the one of the reference temperatures.

The host 3b of the temperature control equipment 3 includes a heating controller 322, a compressor 324b, a condenser 324c, a temperature sensor 37, and a temperature controller 38. The heating controller 322 of the host 3b is connected to the heating unit 320 of the IC thermostatic head 3a, and is used to drive the heating unit 320 to heat the thermal conducting plate 30 to the reference temperature (i.e., the first reference temperature). The cooling controller 326 controls the evaporator 324a, the compressor 324b, and the condenser 324c to form a cooling cycle. The temperature sensor 37 of the host 3b is thermally connected to the IC contacting metal head 34, and is used to sense the actual temperature of the IC contacting metal head 34. The temperature controller 38 of the host 3b is electrically connected between the thermoelectric cooling module 36 of the IC thermostatic head 3a and the temperature sensor 37, and is used to control the thermoelectric cooling module 36 to heat or cool the IC contacting metal head 34, so as to control the actual temperature of the IC contacting metal head 34 to the predetermined temperature.

It can be seem that the temperature control equipment 3 of the embodiment has a separate structure, and the IC contacting metal head 34 controls the temperature of an IC tested object (not shown) by contacting, so the whole volume of the temperature control equipment 3 can be greatly reduced, and the convenience of use can be improved.

Figure 5:
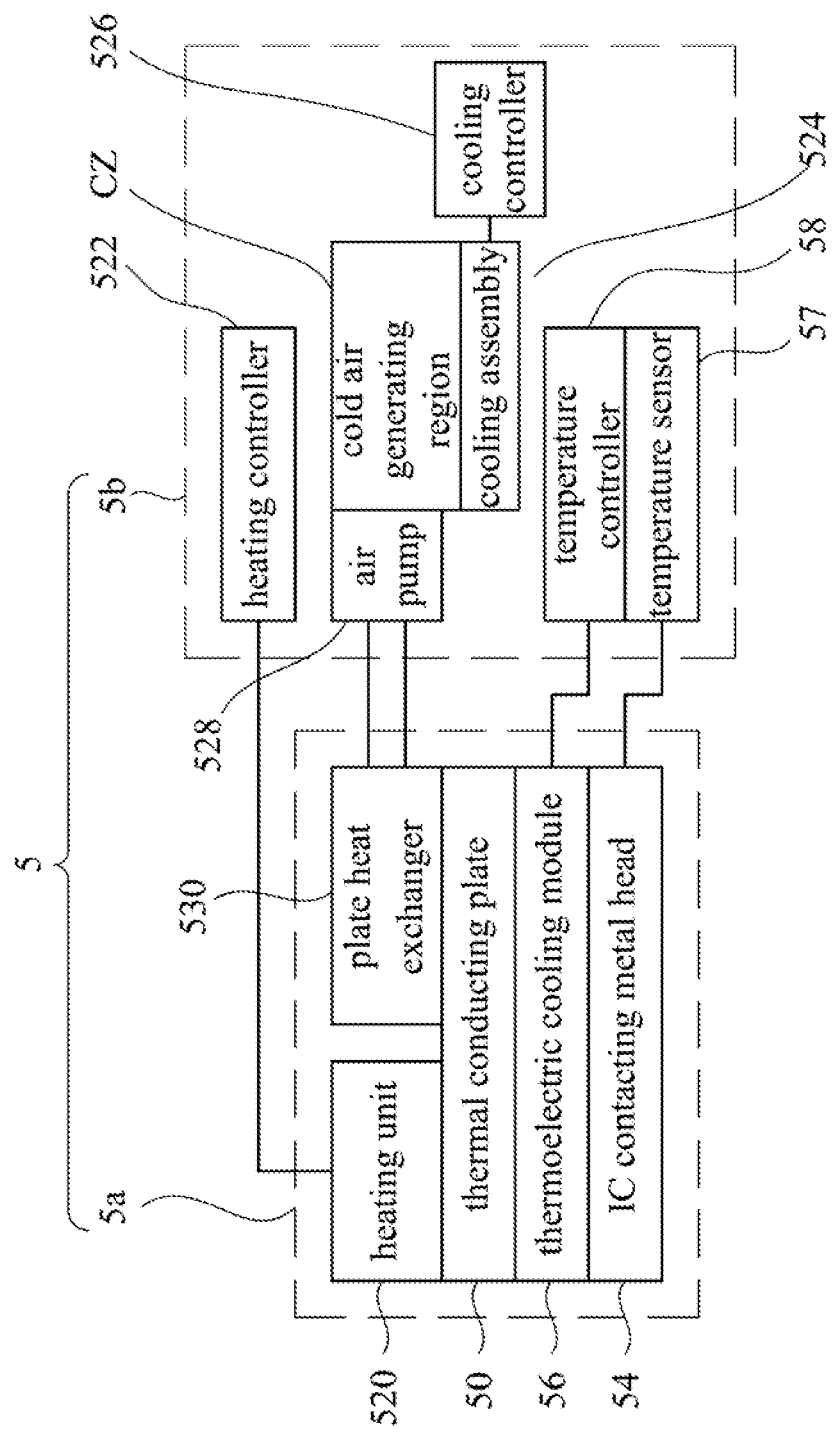
FIG. 5 is a schematic diagram of temperature control equipment according to another embodiment of the disclosure.

FIG. 5 is a schematic diagram of temperature control equipment 5 according to another embodiment of the disclosure. In the embodiment of the disclosure, the temperature control equipment 5 can be applied in IC industry. The temperature control equipment 5 includes an IC thermostatic head 5a and a host 5b. The IC thermostatic head 5a of the temperature control equipment 5 includes a thermal conducting plate 50, a heating unit 520, a plate heat exchanger 530, an IC contacting metal head 54, and a thermoelectric cooling module 56. The heating unit 520 of the IC thermostatic head 5a is thermally connected to the thermal conducting plate 50, and is used to heat the thermal conducting plate 50 to a reference temperature (e.g., a higher first reference temperature). The plate heat exchanger 530 of the IC thermostatic head 5a is thermally connected to the thermal conducting plate 50, and is used to exchange heat with the thermal conducting plate 50, so as to cool the thermal conducting plate 50 to another reference temperature (e.g., a lower second reference temperature). In an embodiment of the disclosure, the plate heat exchanger 530 of the IC thermostatic head 5a includes numerous fins and can provide a cooling capacity similar to the refrigerant. The thermoelectric cooling module 56 of the IC thermostatic head 5a is thermally connected between the thermal conducting plate 50 and the IC contacting metal head 54, and is used to control the IC contacting metal head 54 to the predetermined temperature based on the one of the reference temperatures.

The host 5b of the temperature control equipment 5 includes a heating controller 522, a cooling controller 526, an air pump 528, a temperature sensor 57, and a temperature controller 58. The heating controller 522 of the host 5b is electrically connected to the heating unit 520 of the IC thermostatic head 5a, and is used to drive the heating unit 520 to heat the thermal conducting plate 50 to the reference temperature (i e, the first reference temperature). The cooling assembly 524 can includes the evaporator 124a, the compressor 124b, and the condenser 124c as shown in FIG. 3, and is controlled by the cooling controller 526. The functions, operations of the components and the relationships among the components of the cooling assembly 524 can be referred to foregoing related descriptions and will not be repeated again here. The cooling controller 526 of the host 5b can drive the cooling assembly 524, so as to generate a low-temperature air in the cold air generating region CZ between the cooling assembly 524 and the air pump 528. The air pump 528 of the host 5b is thermally connected to the plate heat exchanger 530 of the IC thermostatic head 5a by two air pipelines. The air pump 528 of the host 5b is used to guide the low-temperature air in the cold air generating region CZ to the plate heat exchanger 530 via one of the air pipelines, and absorb the heat of the thermal conducting plate 50 via the plate heat exchanger 530, so as to cool the thermal conducting plate 50 to the reference temperature (i.e., the second reference temperature). After absorbing the heat of the thermal conducting plate 50, the low-temperature air is transferred to a high-temperature air, and the high-temperature air flows back to the in the cold air generating region CZ via another of the air pipelines. The high-temperature air will be cooled by the cooling assembly 524 in the in the cold air generating region CZ. The temperature sensor 57 of the host 5b is thermally connected to the IC contacting metal head 54, and is used to sense the actual temperature of the IC contacting metal head 54. The temperature controller 58 of the host 5b is electrically connected between the thermoelectric cooling module 56 of the IC thermostatic head 5a and the temperature sensor 57, and is used to control the thermoelectric cooling module 56 to heat or cool the IC contacting metal head 54, so as to control the actual temperature of the IC contacting metal head 54 to the predetermined temperature.

It can be seem that the temperature control equipment 5 of the embodiment also has a separate structure, and the IC contacting metal head 54 controls the temperature of an IC tested object (not shown) by contacting, so the whole volume of the temperature control equipment 5 can be greatly reduced, and the convenience of use can be improved. The temperature control equipment 5 of the embodiment is unnecessary to use a chiller and water pipelines (leakage problems can be avoided), and is unnecessary to cool with the assistance of liquid nitrogen, so the temperature control equipment 5 has an advantage of low costs. In addition, the air, rather than a refrigerant, flows in the air pipelines between the air pump 528 and the plate heat exchanger 530, so the temperature control equipment 5 is more safe and the air pipelines can be easily bended in use.

According to the foregoing recitations of the embodiments of the disclosure, it can be seen that the temperature control equipment of the present disclosure can roughly regulate the thermal conducting plate to the reference temperature by the temperature regulating module, and then precisely control the tested object to the predetermined temperature based on the reference temperature by the thermoelectric cooling module. In other words, the reference temperature provided by the temperature regulating module can substantially reduce the adjusted temperature difference that the thermoelectric cooling module controls the tested object to the predetermined temperature, so that the temperature regulating module can be regarded as the component of increasing the temperature controlling range of the thermoelectric cooling module. In addition, the temperature controller of the thermoelectric cooling module can selectively drive the temperature regulating module and/or the thermoelectric cooling module to control the tested object to the predetermined temperature according to the temperature difference between the predetermined temperature and the ambient temperature. When the temperature difference between the predetermined temperature and the ambient temperature is larger than the temperature controlling range of the thermoelectric cooling module, the temperature controller controls the temperature regulating module and the thermoelectric cooling module to control the tested objected to the predetermined temperature by the foregoing two-stage temperature adjusting approach. When the temperature difference between the predetermined temperature and the ambient temperature is smaller than the temperature controlling range of the thermoelectric cooling module, the temperature controller directly controls the thermoelectric cooling module to control the tested objected to the predetermined temperature.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A temperature control equipment for controlling a tested object to a predetermined temperature, the temperature control equipment comprising:
   a thermal conducting plate;
   a temperature regulating module thermally connected to the thermal conducting plate for regulating the thermal conducting plate to a reference temperature;
   a carrier plate for accommodating the tested object;
   a thermoelectric cooling module thermally connected between the thermal conducting plate and the carrier plate for controlling the tested object to the predetermined temperature via the carver plate, wherein the tested object is controlled to the predetermined temperature based on the reference temperature;
   a temperature sensor thermally connected to the carrier plate for sensing an actual temperature of the tested object; and
   a temperature controller electrical connected between the thermoelectric cooling module and the temperature sensor for controlling the thermoelectric cooling module to heat or to cool the tested object via the carrier plate, so as to control the actual temperature to the predetermined temperature:
      wherein the temperature regulating module comprises:
         a cooling assembly thermally connected to the thermal conducting plate for cooling the thermal conducting plate; and
      a cooling controller electrically connected to the cooling assembly for driving the cooling assembly to cool the thermal conducting plate to the reference temperature.

2. The temperature control equipment of claim 1, wherein the temperature regulating module comprises:
 a heating unit thermally connected to the thermal conducting plate for heating the thermal conducting plate; and
 a heating controller electrically connected to the heating unit for driving the heating unit to heat the thermal conducting plate to the reference temperature.

3. The temperature control equipment of claim 2, wherein:
 the temperature controller is electrically connected to the heating controller;
 the thermoelectric cooling module has a temperature controlling range;
 when a temperature difference between the predetermined temperature and an ambient temperature is larger than the temperature controlling range, the temperature controller controls the heating controller to drive the heating unit, so that the thermoelectric cooling module controls the tested object to the predetermined temperature via the carrier plate, wherein the tested object is controlled to the predetermined temperature based on the reference temperature; and
 when the temperature difference between the predetermined temperature and the ambient temperature is smaller than the temperature controlling range, the temperature controller directly controls the thermoelectric cooling module to the predetermined temperature.

4. The temperature control equipment of claim 1, wherein:
 the temperature controller is electrically connected to the cooling controller;
 the thermoelectric cooling module has a temperature controlling range;
 when a temperature difference between the predetermined temperature and an ambient temperature is larger than the temperature controlling range, the temperature controller controls the cooling controller to drive the cooling assembly, so that the thermoelectric cooling module controls the tested object to the predetermined temperature via the carrier plate, wherein the tested object is controlled to the predetermined temperature based on the reference temperature; and
 when the temperature difference between the predetermined temperature and the ambient temperature is smaller than the temperature controlling range, the temperature controller directly controls the thermoelectric cooling module to the predetermined temperature.

5. The temperature control equipment of claim 1, wherein the cooling assembly comprises:
 an evaporator thermally connected to the thermal conducting plate for absorbing the heat of the thermal conducting plate by a refrigerant so as to cool the thermal conducting plate to the reference temperature;
 a compressor thermally connected to the evaporator and electrically connected to the cooling controller, wherein the cooling controller drives the compressor to compress the refrigerant; and
 a condenser thermally connected between the evaporator and the compressor for dissipating the heat of the refrigerant.

6. The temperature control equipment of claim 1, wherein the temperature regulating module comprises:
 a plate heat exchanger thermally connected to the thermal conducting plate for absorbing the heat of the thermal conducting plate by a low-temperature air, so as to cool the thermal conducting plate to the reference temperature; and
 an air pump connected to the plate heat exchanger and the cooling assembly for transporting the low-temperature air.

7. A temperature control equipment for controlling a tested object to a predetermined temperature, the temperature control equipment comprising:
 a thermal conducting plate;
 a heating unit thermally connected to the thermal conducting plate for heating the thermal conducting plate;
 a heating controller electrically connected to the heating unit for driving the heating unit to heat the thermal conducting plate to a first reference temperature;
 a cooling assembly thermally connected to the thermal conducting plate for cooling the thermal conducting plate;
 a cooling controller electrically connected to the cooling assembly for driving the cooling assembly to cool the thermal conducting plate to a second reference temperature;
 a carrier plate for accommodating the tested object; and
 a thermoelectric cooling module thermally connected between the thermal conducting plate and the carrier plate for controlling the tested object to the predetermined temperature via the carrier plate, wherein the tested object is controlled to the predetermined temperature based on the first reference temperature or the second reference temperature.

8. The temperature control equipment of claim 7, further comprising:
 a temperature sensor thermally connected to the carrier plate for sensing an actual temperature of the tested object; and
 a temperature controller electrically connected between the thermoelectric cooling module and the temperature sensor for controlling the thermoelectric cooling module to heat or to cool the tested object via the carrier plate, so as to control the actual temperature to the predetermined temperature.

9. The temperature control equipment of claim 8, wherein:
 the temperature controller is electrically connected to the heating controller and the cooling controller;
 when the predetermined temperature is larger than an ambient temperature, the temperature controller controls the heating controller to drive the heating unit, so that the thermoelectric cooling module controls the tested object to the predetermined temperature via the carrier plate, wherein the tested object is controlled to the predetermined temperature based on the first reference temperature; and
 when the predetermined temperature is smaller than the ambient temperature, the temperature controller controls the cooling controller to drive the cooling assembly, so that the thermoelectric cooling module controls the tested object to the predetermined temperature via the carrier plate, wherein the tested object is controlled to the predetermined temperature based on the second reference temperature.

* * * * *